(12) United States Patent
Peng et al.

(10) Patent No.: US 9,654,974 B2
(45) Date of Patent: May 16, 2017

(54) MOBILE DEVICE AND METHOD FOR UNLOCKING SCREEN OF MOBILE DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Yan-Hua Peng, Shenzhen (CN); Jia-Yi Xu, Shenzhen (CN); Zhi-Xiong Du, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 57 days.

(21) Appl. No.: 14/739,071

(22) Filed: Jun. 15, 2015

(65) Prior Publication Data

US 2015/0373185 A1 Dec. 24, 2015

(30) Foreign Application Priority Data

Jun. 20, 2014 (CN) .......................... 2014 1 0276667

(51) Int. Cl.
| | | |
|---|---|---|
| *H04M 1/725* | (2006.01) | |
| *H04W 12/06* | (2009.01) | |
| *H04M 1/673* | (2006.01) | |
| *H04L 29/06* | (2006.01) | |

(52) U.S. Cl.
CPC ............. *H04W 12/06* (2013.01); *H04L 63/18* (2013.01); *H04M 1/673* (2013.01)

(58) Field of Classification Search
CPC ............... H04L 63/0428; H04L 63/083; H04L 63/0876; H04W 12/06
USPC .................................. 762/16; 455/411; 726/5
See application file for complete search history.

(56) References Cited

U.S. PATENT DOCUMENTS

| | | | |
|---|---|---|---|
| 8,046,721 B2 | 10/2011 | Chaudhri et al. | |
| 9,372,977 B2* | 6/2016 | Fan .......................... | G06F 21/31 |
| 2010/0122324 A1* | 5/2010 | Welingkar .............. | H04W 4/00 |
| | | | 726/5 |
| 2013/0305047 A1* | 11/2013 | Xi ........................ | H04L 63/0428 |
| | | | 713/168 |
| 2014/0053258 A1* | 2/2014 | Lin .......................... | G06F 21/31 |
| | | | 726/19 |

FOREIGN PATENT DOCUMENTS

| | | |
|---|---|---|
| CN | 102930188 A | 2/2013 |
| CN | 103546636 A | 1/2014 |
| TW | 201137658 A | 11/2011 |

* cited by examiner

*Primary Examiner* — Matthew Sams
*Assistant Examiner* — Gary Lafontant
(74) *Attorney, Agent, or Firm* — Steven Reiss

(57) ABSTRACT

In a method for unlocking a screen of a mobile device, at least one user-specific number is set and stored into a storage unit of the mobile device. The user-specific number is read from the storage unit and displayed on the screen for selection by a user, when the screen is locked because of input of a wrong password. An unlocking request is transmitted to a terminal providing the selected user-specific number. The mobile device communicates with the terminal, and receives a confirmation message from the terminal, and the screen is unlocked according to the confirmation message.

12 Claims, 3 Drawing Sheets

MOBILE DEVICE AND METHOD FOR UNLOCKING SCREEN OF MOBILE DEVICE

CROSS-REFERENCE TO RELATED APPLICATIONS

This application claims priority to Chinese Patent Application No. 201410276667.4 filed on Jun. 20, 2014, the contents of which are incorporated by reference herein.

FIELD

The subject matter herein generally relates to electronic security.

BACKGROUND

Many mobile devices can unlock their screen according to an unlocking password, and the unlocking password may be a combination of figures, letters, and symbols. However, if a user of the mobile device inputs wrong password of the screen many times, the screen may be locked and the user cannot input any password. Therefore, if the user forgets right password, the screen of the mobile device cannot be unlocked.

BRIEF DESCRIPTION OF THE DRAWINGS

Implementations of the present technology will now be described, by way of example only, with reference to the attached figures, wherein.

DETAILED DESCRIPTION

Figure 1:
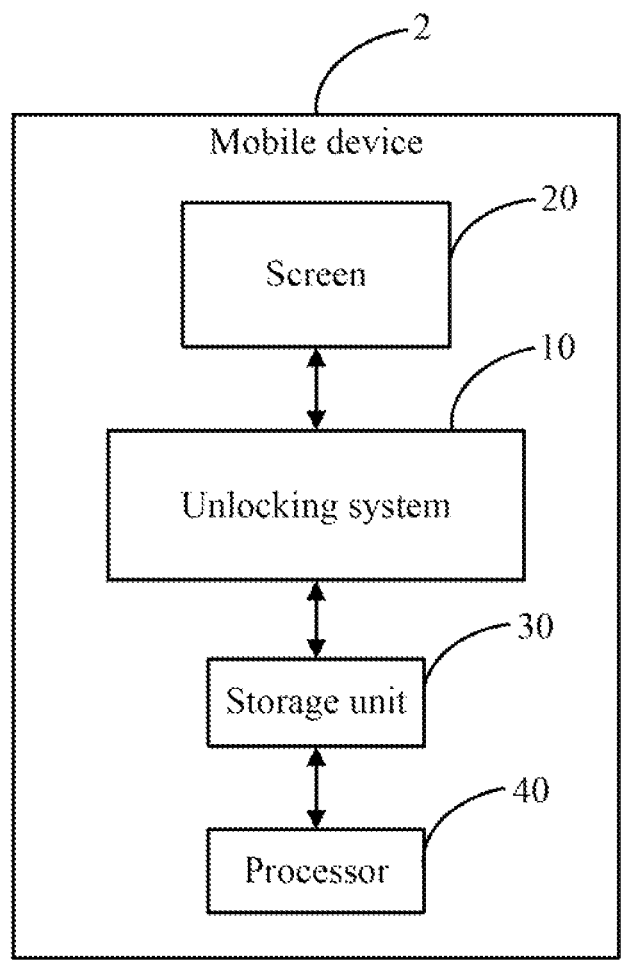
FIG. 1 illustrates a block diagram of an embodiment of a mobile device including an unlocking system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a block diagram of an embodiment of a mobile device 2. In the embodiment, the mobile device 2 includes an unlocking system 10, a screen 20, a storage unit 30, and a processor 40. The mobile device 2 may be a touch panel computer or a mobile phone, for example.

Figure 2:
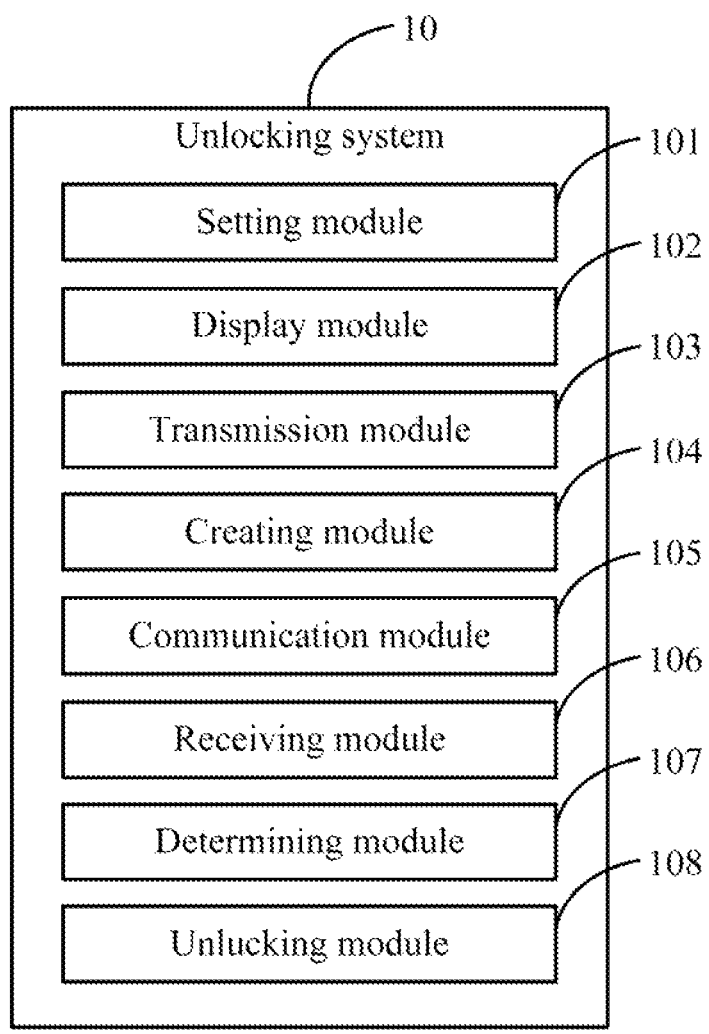
FIG. 2 illustrates a block diagram of an embodiment of function modules of the unlocking system in FIG. 1.

FIG. 2 illustrates a block diagram of an embodiment of function modules of the unlocking system 10. The one or more function modules can include computerized code in the form of one or more programs that are stored in the storage unit 30, and executed by the processor 40 to provide functions of the unlocking system 10. The storage unit 30 can be a dedicated memory, such as an EPROM or a flash memory.

In an embodiment, the unlocking system 10 includes a setting module 101, a display module 102, a transmission module 103, a creating module 104, a communication module 105, a receiving module 106, a determining module 107, and an unlocking module 108. Descriptions of the functions of the modules 101-108 are given with reference to FIG. 3.

Figure 3:
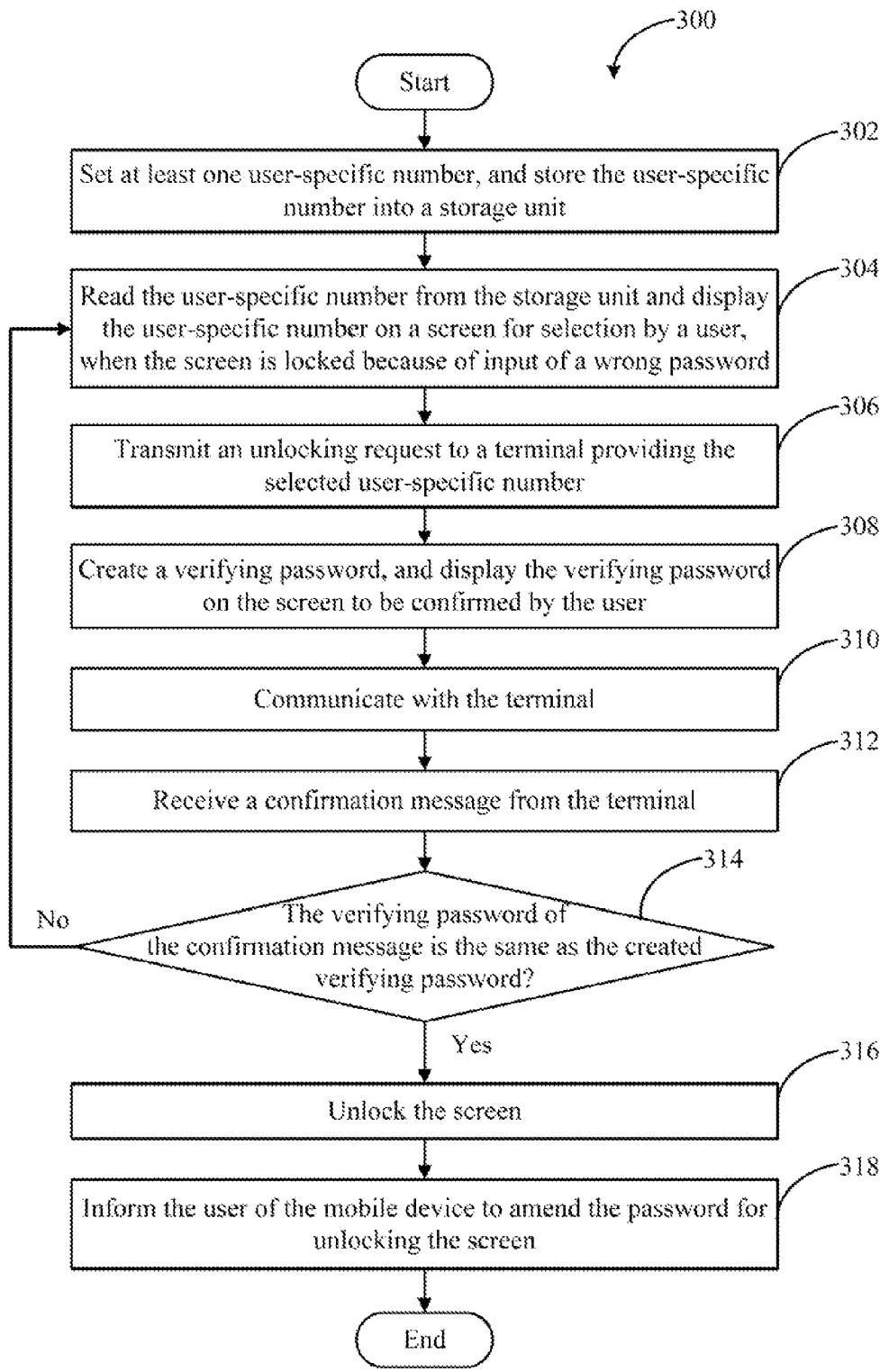
FIG. 3 illustrates a flowchart of an embodiment of a method for unlocking a screen of the mobile device.

Referring to FIG. 3, a flowchart is presented in accordance with an example embodiment of a method 300 for unlocking the screen 20 of the mobile device 2. The method 300 is provided by way of example, as there are a variety of ways to carry out the method. The method 300 described below can be carried out using the configurations illustrated in FIGS. 1 and 2, for example, and various elements of these figures are referenced in explaining the method 300. Each block shown in FIG. 3 represents one or more processes, methods, or subroutines, carried out in the exemplary method 300. Additionally, the illustrated order of blocks is by example only and the order of the blocks can change. The method 300 can begin at block 302.

At block 302, the setting module 101 sets at least one user-specific number, and stores the user-specific number into the storage unit 30. In the embodiment, the at least one user-specific number may be mobile phone number of friends or family of a user of the mobile device 2.

At block 304, the display module 102 reads the user-specific number from the storage unit 30 and displays the user-specific number on the screen 20 for selection by the user, when the screen 20 is locked because of input of a wrong password. It is understood that the screen 20 can display some special information, such as the user-specific number in this embodiment, even when the screen 20 is at a locked state.

At block 306, the transmission module 103 transmits an unlocking request to a terminal providing the selected user-specific number. In the embodiment, the unlocking request may be a message, for example "The screen of my mobile device is locked. Please help me to unlock it!"

At block 308, the creating module 104 creates a verifying password, and displays the verifying password on the screen 20 to be confirmed by the user. Then the user can communicate with an operator of the terminal and tell him/her the verifying password. In the embodiment, the verifying password may be a combination of figures, letters, and symbols. When the terminal receives the unlocking request, the operator of the terminal may make a call to the mobile device 2 to determine whether the user of the mobile device 2 himself/herself requires help to unlock the mobile device 2.

At block 310, the communication module 105 communicates with the terminal. Communication content includes the verifying password. In the embodiment, the communication module 105 receives the call from the terminal, so the user of the mobile device 2 can talk with the operator of the terminal and tell him/her the verifying password. Then the operator of the terminal sends a confirmation message which includes the verifying password to the mobile device 2.

At block 312, the receiving module 106 receives the confirmation message from the terminal.

At block 314, the determining module 107 determines whether the verifying password of the confirmation message is the same as the created verifying password. In the embodiment, the determining module 107 compares the verifying password of the confirmation message with the verifying password created by the creating module 104. If the verifying password of the confirmation message is the same as the created verifying password, the method 300 implements block 316. If the verifying password of the confirmation message is not the same as the created verifying password, the method 300 returns to block 304.

At block 316, the unlocking module 108 unlocks the screen 20.

At block 318, the display module 102 informs the user of the mobile device 2 to amend the password for unlocking the screen 20. In the embodiment, the display module 102 displays this information on the screen 20.

The embodiments shown and described above are only examples. Many details are often found in the art such as the other features of a mobile device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A computer-implemented method, executable by a processor of a mobile device, the method comprising:
   setting at least one user-specific number and storing the user-specific number into a storage unit of the mobile device;
   reading the user-specific number from the storage unit and displaying the user-specific number on a screen of the mobile device for selection by a user, in event the screen is locked because of input of a wrong password;
   transmitting an unlocking request to a terminal providing the selected user-specific number;
   creating a verifying password when the unlocking request is transmitted to the terminal;
   displaying the verifying password on the screen to be confirmed by the user;
   receiving a confirmation message from the terminal; and
   unlocking the screen according to the confirmation message.

2. The method as claimed in claim 1, wherein the mobile device communicates with the terminal after transmitting the unlocking request to the terminal, and either the communication content or the confirmation message sent from the terminal comprises the verifying password.

3. The method as claimed in claim 2, wherein the step of unlocking the screen according to the confirmation message further comprises:
   determining whether the verifying password of the confirmation message is the same as the created verifying password; and
   unlocking the screen when the verifying password of the confirmation message is the same as the created verifying password.

4. The method as claimed in claim 1, further comprising:
   informing the user of the mobile device to amend the password for unlocking the screen after the screen is unlocked.

5. A non-transitory storage medium, storing a set of instructions, the set of instructions being executed by a processor of a mobile device, to perform a method comprising:
   setting at least one user-specific number and storing the user-specific number into a storage unit of the mobile device;
   reading the user-specific number from the storage unit and displaying the user-specific number on a screen of the mobile device for selection by a user, in event the screen is locked because of input of a wrong password;
   transmitting an unlocking request to a terminal providing the selected user-specific number;
   creating a verifying password when the unlocking request is transmitted to the terminal;
   displaying the verifying password on the screen to be confirmed by the user;
   receiving a confirmation message from the terminal; and
   unlocking the screen according to the confirmation message.

6. The non-transitory storage medium as claimed in claim 5, wherein the mobile device communicates with the terminal after transmitting the unlocking request to the terminal, and either the communication content or the confirmation message sent from the terminal comprises the verifying password.

7. The non-transitory storage medium as claimed in claim 6, wherein the step of unlocking the screen according to the confirmation message further comprises:
   determining whether the verifying password of the confirmation message is the same as the created verifying password; and
   unlocking the screen when the verifying password of the confirmation message is the same as the created verifying password.

8. The non-transitory storage medium as claimed in claim 5, wherein the method further comprises:
   informing the user of the mobile device to amend the password for unlocking the screen after the screen is unlocked.

9. A mobile device, the mobile device comprising:
   a screen;
   at least one processor;
   a storage unit; and
   one or more programs that are stored in the storage unit and executed by the at least one processor, the one or more programs comprising instructions for:
   setting at least one user-specific number and storing the user-specific number into the storage unit;
   reading the user-specific number from the storage unit and displaying the user-specific number on the screen for selection by a user, in event the screen is locked because of input of a wrong password;

transmitting an unlocking request to a terminal providing the selected user-specific number;

creating a verifying password when the unlocking request is transmitted to the terminal;

displaying the verifying password on the screen to be confirmed by the user;

receiving a confirmation message from the terminal; and unlocking the screen according to the confirmation message.

10. The mobile device as claimed in claim 9, wherein the mobile device communicates with the terminal after transmitting the unlocking request to the terminal, and either the communication content or the confirmation message sent from the terminal comprises the verifying password.

11. The mobile device as claimed in claim 10, wherein the step of unlocking the screen according to the confirmation message further comprises:

determining whether the verifying password of the confirmation message is the same as the created verifying password; and unlocking the screen when the verifying password of the confirmation message is the same as the created verifying password.

12. The mobile device as claimed in claim 9, wherein the one or more programs further comprises instructions for:

informing the user of the mobile device to amend the password for unlocking the screen after the screen is unlocked.

* * * * *